United States Patent
Nelson et al.

(10) Patent No.: US 7,962,266 B2
(45) Date of Patent: Jun. 14, 2011

(54) METHOD, CONTROLLER AND VEHICLE FOR PERFORMING AGRICULTURAL OPERATIONS ON A FIELD WITH PARALLEL ARRANGED ROWS

(75) Inventors: Frederick William Nelson, Waukee, IA (US); Broughton Boydell, NSW (AU); Robert Lynn Mayfield, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 556 days.

(21) Appl. No.: 11/687,107

(22) Filed: Mar. 16, 2007

(65) Prior Publication Data

US 2008/0228360 A1  Sep. 18, 2008

(51) Int. Cl.
*G06F 7/70* (2006.01)

(52) U.S. Cl. ............ 701/50; 701/23; 701/28; 701/120; 701/200; 348/116; 348/119; 348/162; 348/148; 348/113

(58) Field of Classification Search ............. 701/50, 701/23, 28, 120, 200; 348/116, 119, 162, 348/148, 113
See application file for complete search history.

(56) References Cited

U.S. PATENT DOCUMENTS

| | | | |
|---|---|---|---|
| 3,037,356 A * | 6/1962 | Alcoriza | 405/41 |
| 4,359,106 A * | 11/1982 | Nevarez | 172/529 |
| 4,835,691 A * | 5/1989 | Rotem et al. | 701/23 |
| 5,991,694 A | 11/1999 | Gudat et al. | |
| 6,070,673 A | 6/2000 | Wendte | |
| 6,686,951 B1 * | 2/2004 | Dickson et al. | 348/120 |
| 2003/0187560 A1 * | 10/2003 | Keller et al. | 701/50 |

OTHER PUBLICATIONS

GC Agriculture Advance Row Cropping. GC Agriculture Rotobucks [online]. [retrieved on Feb. 20, 2007]. Retrieved from the Internet: <URL: http://www.gcagriculture.comau/rotobuck.htm>.

AgGuide. RotaGuide—2cm GPS control of the Rota Bucket. [online]. [retrieved on Feb. 20, 2007]. Retrieved from the Internet:<URL: http://www.agguide.com/au/rotaguide/htm>.

* cited by examiner

*Primary Examiner* — Mark Hellner
*Assistant Examiner* — Redhwan Mawari

(57) ABSTRACT

A method, a controller and a vehicle for performing agricultural operations on a field with parallel arranged rows having ends. The operations are performed at positions related to the positions of the rows under control of the controller, based upon stored information about the orientation of the rows, stored information about a distance between adjacent rows, a distance signal related to a distance traveled by the vehicle and a direction signal related to the heading of the vehicle. The invention is particularly suited for providing dams to prevent water from a head ditch to enter into pre-selected, dry furrows on a field with an irrigation arrangement with raised rows and lower furrows between the rows, or dams matching up with adjacent raised rows so that water runs down each furrow.

19 Claims, 3 Drawing Sheets

METHOD, CONTROLLER AND VEHICLE FOR PERFORMING AGRICULTURAL OPERATIONS ON A FIELD WITH PARALLEL ARRANGED ROWS

FIELD OF THE INVENTION

The present invention relates to a method, a controller and a vehicle for performing agricultural operations on a field with rows having ends, the rows being generally parallel to each other.

BACKGROUND OF THE INVENTION

There are a number of agricultural operations to be performed at ends of rows on a field. Such rows are in the most cases arranged in parallel and the distances between the rows are equal or at least similar.

A first example of such an operation is to deposit and collect boxes into which workers put vegetables or fruit harvested from plants grown in the rows. Another example is maintenance of an irrigated field. Such fields can comprise parallel raised rows and parallel lower furrows between the rows. Plants are grown on the raised rows, while the water is allowed to flow in a number of the furrows for watering the plants. A common situation is to flow water between alternating raised rows to conserve water and prevent waterlogging. However, other arrangements can also be made. A head ditch provided at the end of the field and extending generally perpendicular to the rows and furrows contains water for the field and needs thus to be connected to those furrows into which water is to flow.

One method of controlling which furrow(s) are to have water flowing into them is to create dams between the head ditch and those furrows that are to be kept dry. The other furrows are, due to lack of a dam between them and the head ditch, connected to the head ditch and get watered. These dams are called rotobucks and produced with a dedicated type of implement (also called a rotobuck) that is pulled by a vehicle, usually a tractor, and scrapes ground material together when the vehicle is moving. The implement is triangular shaped with a point on each triangle tip that penetrates into the ground and builds up a mound of ground material along a curved edge of one side of the triangle, which will become the dam. A latch holds the tool in place as the vehicle pulls it around the field. When the latch is released, the tool rotates, depositing the ground material that has been built up along the curved edge of the triangle, and then rotating the tool to the next side, where another mound of ground material is built up for subsequent deposit.

In the prior art, the latch, which is hydraulically moved, is controlled manually by the operator of the tractor, by a suitable interface within the operator cabin. The position where, or the time when, to release the latch is critical to ensure that the dam is deposited in the proper location. Often, a second person is used to watch the position of the rotobuck device in the field and tell the tractor driver when to release the latch. When the correct position is missed, the operator or the second person needs to use a shovel to rebuild the dam at the correct location. Thus, manual control of the rotobuck device is a difficult and time consuming task. Additionally, the dams may need to be rebuilt every time it is necessary to go into the field with other devices, like sprayers, since they are normally destroyed or damaged by these other devices. This may happen several times during a growing season.

Automatically controlled arrangements for providing the dams are available, that steer the tractor along the head ditch, while software controls the implement to provide the dams. However, since these arrangements rely on a single spacing of the dams, a problem arises when the angle between the head ditch and the rows varies over a field, since this angle has an impact on the correct spacing between adjacent dams.

Since many fields are not completely rectangular in shape, especially at field ends, there is a need for a simple and reliable system for automatically performing agricultural operations on a field with parallel arranged rows having ends that are not all at the same angle to the head ditch.

It is an object of the present invention to provide a simple and reliable system for automatically performing agricultural operations on a field with parallel arranged rows having ends, such that the operations are automatically performed at desired locations related to the positions of the rows with respect to the head ditch.

SUMMARY OF THE INVENTION

A method of performing agricultural operations on a field with parallel arranged rows having ends comprises propelling a vehicle past the ends of the rows and performing agricultural operations at the ends of the rows with an implement connected to the vehicle at desired positions related to the positions of the rows under control of a controller device. The controller controls the implement based upon stored information about the orientation of the rows, stored information about a distance between adjacent rows, a distance signal related to a distance traveled by the vehicle and a direction signal related to the heading of the vehicle.

The distance between adjacent operations depends on the distance between adjacent rows. If the angle between the propelling direction and the longitudinal direction of the rows is not perpendicular, the distance between the operations needs to be adjusted accordingly in order to ensure that they are performed at the desired locations with respect to the rows. The controller therefore derives this angle from a direction signal containing information about the heading direction of the vehicle and stored information on the orientation of the rows, for example their angle enclosed with the north-south direction. An adapted distance between operations is calculated and the implement is controlled based upon this distance and a distance signal related to a distance traveled by the vehicle.

An advantage of the invention is that a spacing of adjacent dams can be automatically adjusted to compensate for non-perpendicular paths across the rows, such that the vehicle can be operated in all field shapes. The automated spacing of the dams will ensure that the manual repairs that are required with imperfectly spaced dams will be minimized. Also other operations, such as automated depositing and collecting boxes from ends of rows, can be performed with high precision.

The angle between the rows and the heading of the implement can be derived by the controller from the stored information about the orientation of the rows and from the direction signal related to the heading of the vehicle. The latter, like the distance signal, can be derived from a location signal generation arrangement generating location data of the position of the vehicle and/or the implement. This location signal generation arrangement can be a Global Positioning System (GPS) or Differential Global Positioning System (DGPS) antenna mounted on the vehicle or on the implement, or a GPS or DGPS antenna mounted on both of them, or some other arrangement or types of devices, as appropriate.

The controller is preferably connected to an operator interface. The operator of the vehicle can input at least one of the following into the operator interface: information about the orientation of the rows, information about the distance between adjacent rows, information about a desired distance between adjacent operations, information about an offset between the positions of the location signal generation arrangement and the implement, information about a desired location of a first operation, information about the dimensions of the implement, and fine adjustment data for the positions on which the operations are performed. The input data is stored in memory and the controller uses the stored information for controlling the implement.

In a preferred embodiment, the method and system is particularly suitable for providing dams on irrigated fields, having an irrigation arrangement with raised rows, lower furrows between the rows, and a transverse head ditch in the vicinity of the ends of the furrows. The implement is depositing ground material at the desired locations in order to provide dams between the head ditch and raised rows to prevent water from the head ditch from entering into pre-selected, dry furrows. The dams can in another embodiment be positioned to match up with each raised row so that water runs down each furrow. Of course, parts of a field can have parts with dams watering alternating furrows and other parts on which dams match with the raised rows such that all furrows are watered. The implement (rotobuck) is scraping ground material together when the vehicle is moving, and the controller is controlling the implement to release the ground material at the desired location to build a dam. These and other objects, features and advantages of the present invention will become apparent to one skilled in the art upon reading the following detailed description in view of the drawings.

DESCRIPTION OF THE PREFERRED EMBODIMENT

Figure 1:
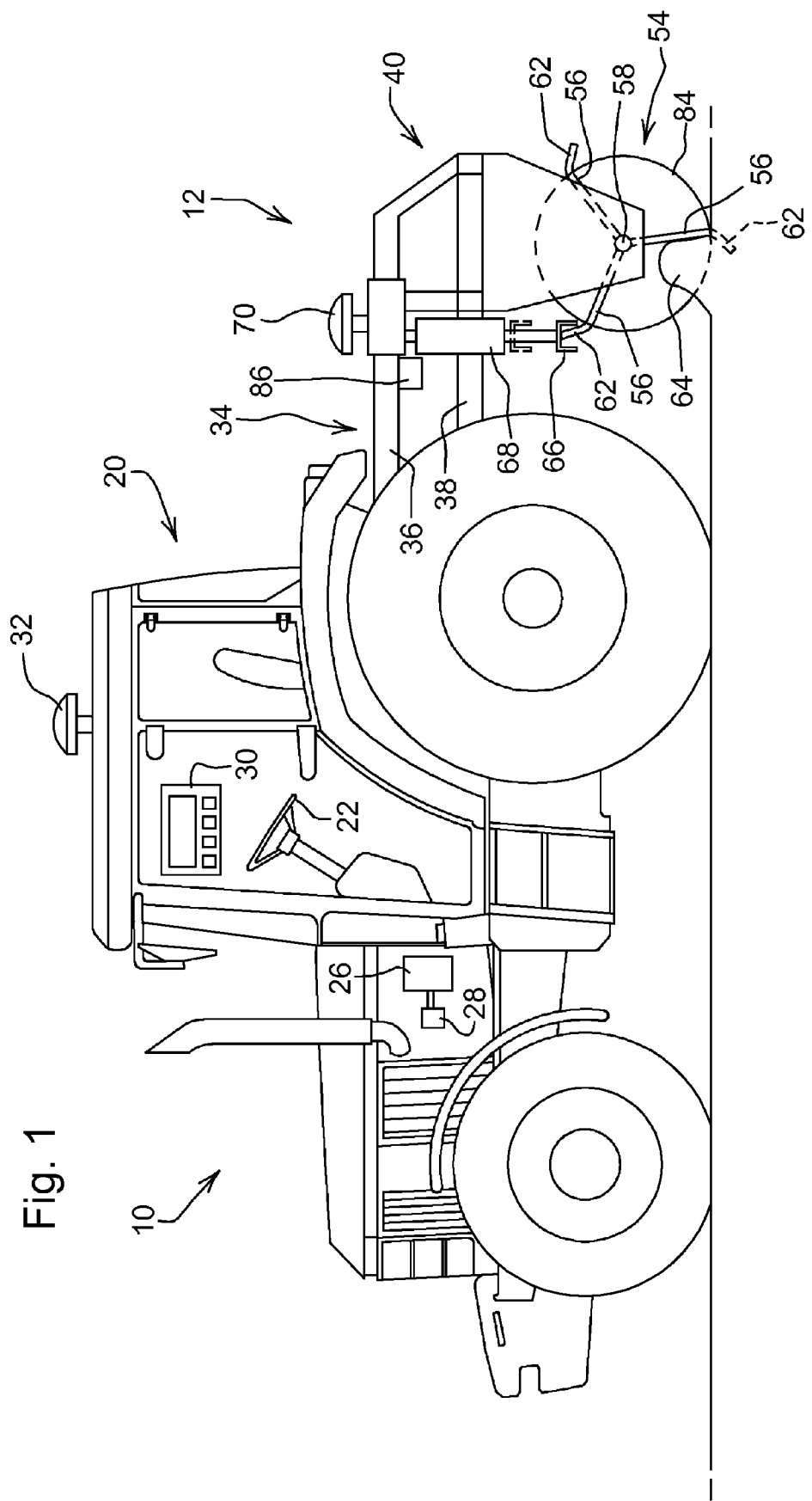
FIG. 1 is a side view of a vehicle with an implement and a controller for controlling the implement.

In FIG. 1, a vehicle 10, shown in this case in the form of a tractor, and an implement 12 mounted behind the tractor are shown. The vehicle 10 has an operator's cab 20, in which a steering wheel 22 for steering the vehicle, and pedals and/or levers (not shown) for inputting a desired speed of the vehicle 10 are located. On board the vehicle 10, a controller 26 is located. The controller 26 is connected to a memory 28, an operator interface 30 in the cab 20, and to a first location signal generation arrangement 32 mounted on the roof of the cab 20 and comprising an antenna for receiving signals from a satellite-based positioning system like GPS, Glonass or Galileo.

At the rear end of the vehicle 10, a three point hitch 34 comprising an upper draft linkage 36 and two lower draft linkages 38 is used to connect implement 12 to the vehicle 10. The linkages 36 and 38 are adjustable to adjust the vertical position of implement 12 during operation and to lift it when desired.

The implement 12 comprises a frame 40, below which and to a tool 54 is mounted. In a preferred embodiment of the invention, tool 54 comprises three blades 56 radially extending from a central shaft 58, offset to the adjacent blade 56 by 120° and at their ends (and between them) interconnected by supporting disks 84. Shaft 58 is connected to beams of the frame 40 and rotatably supported by suitable bearings (not shown). The blades 56 have forwardly curved outer tips 62 that are suited to scrape and collect ground material in front of the blade 56 when vehicle 10 is propelled forward, as can be seen at the mound of ground material 64 shown in FIG. 1. Rotation of shaft 58 and blades 56 is selectively inhibited by a latch 66 that can be moved by an actuator 68 in the form of a double acting hydraulic cylinder between an operative position blocking rotation of shaft 58 and blades 56, as shown in FIG. 1, and a lifted operative position (not shown), allowing rotation of shaft 58 and blades 56 in order to release mound 64 to build a dam at a desired location. Actuator 68 is mounted to the frame 40.

On top of the frame 40, a second location signal generation arrangement 70 comprising an antenna for receiving signals from a satellite based positioning system like GPS, Glonass or Galileo is provided. The second location signal generation arrangement 70 and a valve assembly 86 control the actuator 68, and are connected to controller 26. These connections, like the connections between controller 26, operator interface 30 and first location signal generation arrangement 32, can be provided by a bus or wirelessly by radio connection. Valve assembly 86 is connected to the hydraulic system of vehicle 10.

Figure 2:
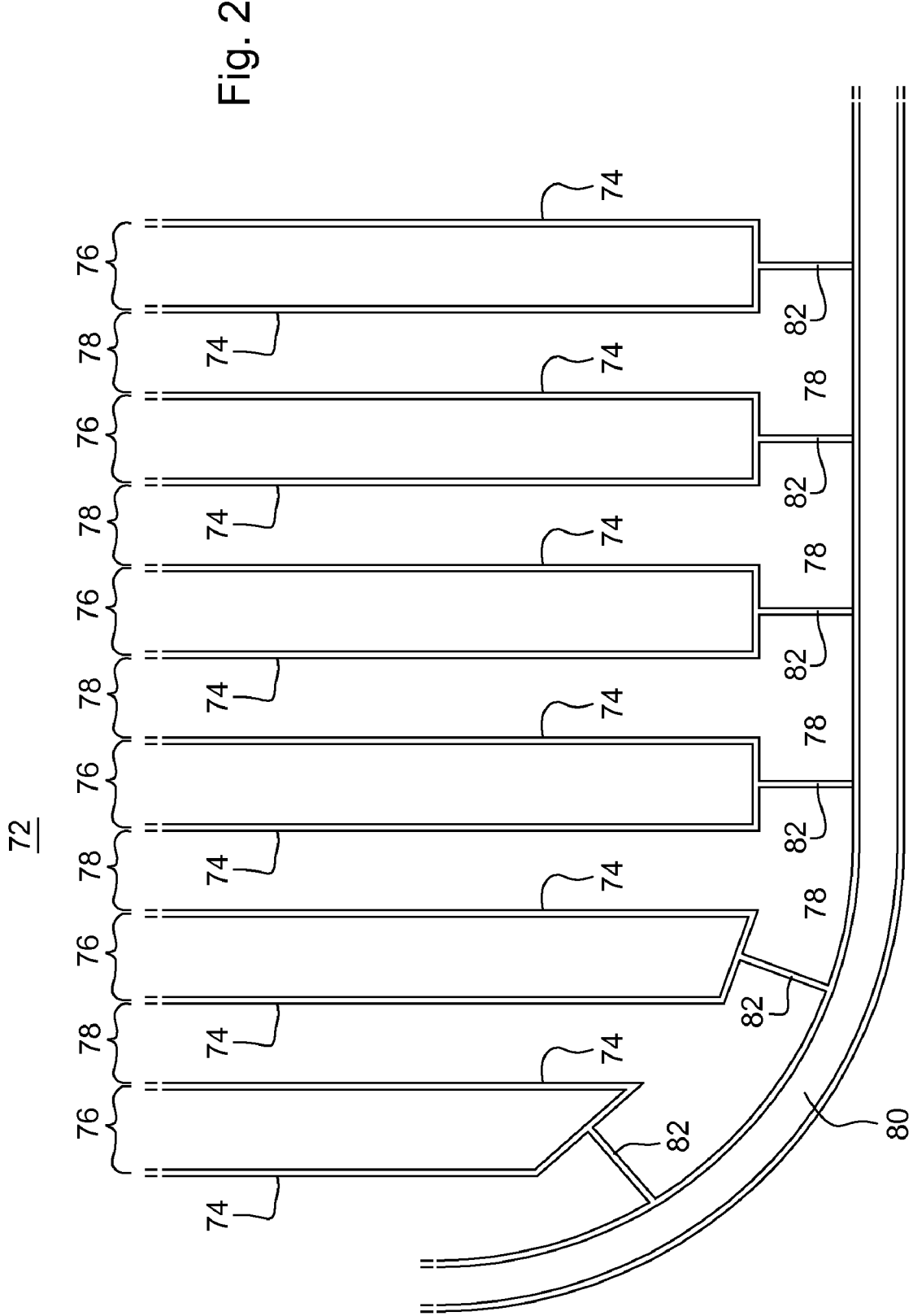
FIG. 2 is a schematic top view of an irrigated field, on which the vehicle of FIG. 1 can provide dams.

An irrigated field 72 is shown in FIG. 2. On the field 72, a number of parallel raised rows 74 and lower furrows 76, 78 are provided. The rows 74 and furrows 76, 78 have ends in the vicinity of a head ditch 80. On the rows 74, plants are grown, while the furrows 76 are dry, and the furrows 78 are filled with water from the head ditch 80. Furrows 76 and 78 are arranged in an alternating manner in the embodiment shown in FIG. 2. In order to prevent water from entering into furrows 76 to conserve water and prevent waterlogging, dams 82 are provided, which extend transversely to the head ditch 80 and build, in cooperation with the raised rows 74 adjacent furrow 76, a barrier to prevent the water in the head ditch 80 from entering furrows 76.

These dams 82 are also known as "rotobucks", like the implement 12, and produced with the vehicle/implement combination shown in FIG. 1. In another embodiment of an irrigated field (not shown), the dams 82 match up with each raised row 74 so that water runs down each furrow 76 and 78. As can be seen in FIG. 2, when the head ditch or edge of a field as a curve, angle or other bend, the dams 82 have to change shape and/or the angle to the head ditch 80 in order to be properly aligned to the raised rows 74 so as to allow or prevent water from running into the furrows 76, 78.

Figure 3:
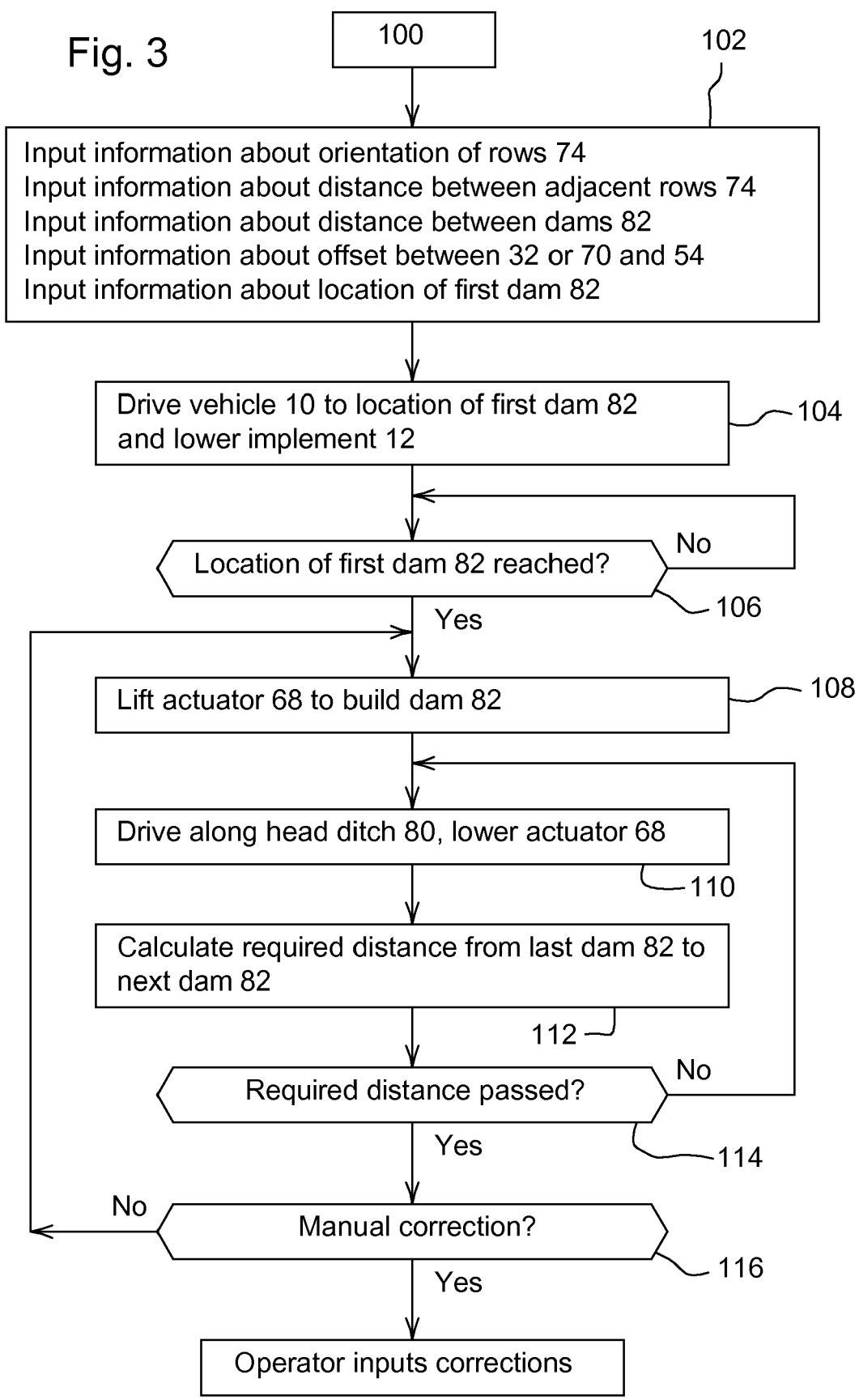
FIG. 3 is a flow diagram according to which the controller of FIG. 1 works.

In order to overcome difficulties in accurately releasing latch 66 manually from cab 20 at the appropriate time to get the dam 82 to the desired position in which it blocks water from entering the adjacent furrow 76 (or in the other embodiment, matches up with row 74), controller 26 proceeds according to the flow diagram of FIG. 3.

The process begins at step 100. In step 102, one or more of the following types of information is input into memory 28, typically by means of an operator interface: (a) Information about the orientation of the rows 74. This can be the angle of the rows 74 with respect to the north-south direction or within any coordinate system. It would also be possible to drive the vehicle 10 along a row 74 and to derive the information about the orientation of the rows 74 from one of the location signal generation arrangements 32 and 70, telling the controller 26 via the operator interface 30 that the vehicle 10 is now driving along a row 74. (b) Information about the distance between adjacent rows 74. It would also be possible to store a map of field 72, including location and orientation of one, two or all the rows 74, in memory 28 and to derive this distance and/or the orientation of the rows 74 from this map. (c) Information about the desired distance between adjacent dams 82. This can be a value in meters or any other length unit, or data about the number of rows 74 between adjacent dams 82, which would in the example of FIG. 2 be two (and in the other embodiment, in which the dams 82 match up with the rows 74, one). (d) Information about the offset between one of the location signal generation arrangements 32 and 70 and the position of the dam 82 when latch 66 is raised. Here, it might be useful also to input data about the dimensions of the tool 54. (e) Further, information about the location of the first dam 82 to be made can be input in terms of geo-referenced coordinates. In another embodiment, the controller 26 would receive an input via operator interface 30 once the vehicle 10 is in a position where the first dam 82 needs to be deposited.

In the following step 104, the vehicle 10 is driven by the operator, or when it is already on the field, optionally by an automatic steering system, close to the location of where the first dam 82 should be placed, for example the rightmost dam 82 in FIG. 2. Some distance before this location is reached, implement 12 is lowered by means of hitch 34 and/or linkages 36, 38 such that a blade 56 with tip 62 has built up a mound 64 when the location of the first desired dam 82 is reached.

Then, in step 106 the system determines, based upon the information about the location of the first dam 82 (from step 102 (e)) and/or the information about the offset between one of the location signal generation arrangements 32 and 70 and the position of the dam 82 when latch 66 is raised (from step 102, (d)), and/or data from one or both of the location signal generation arrangements 32 and 70 whether the location for depositing the dam 82 has been reached.

In step 108, when it is determined that the position for depositing the dam 82 has been reached, controller 26 instructs actuator 68 to lift latch 66 such that the collected ground material is deposited, and dam 82 is built. As already mentioned, alternatively, instead of steps 106 and 108, the operator can drive vehicle 10 to the location of the first dam 82 and inform the controller 26 by means of the operator interface 30 accordingly. In the other embodiment (not shown), in which the dams 82 match up with the rows 74, the first dam would be aligned with a first row 74.

In step 110, vehicle 10 is driven along the head ditch 80 towards the next dam 82 and after a short distance, actuator 68 is lowered again in order to build up a new mound 64 of ground material. The vehicle 10 is driven under control of the operator or automatically by the controller 26 according to a stored map and signals from one or both of the location signal generation arrangements 32 and 70.

In step 112, the required distance between the last dam 82 and the next dam 82 is calculated. For this calculation, first of all the distance between adjacent dams when driving the vehicle 10 perpendicular to the rows is determined, based upon the information (b) and (c) from step 102. In the example of FIG. 2, this distance would be twice the distance between adjacent rows 74, since every second furrow 76 from furrows 76, 78 gets no water. In the other embodiment, in which the dams 82 match up with the rows 74, this distance would correspond to the distance between adjacent rows 74. It should be noted that if the desired distance between the dams 82 is directly inputted in step 102, the distance between adjacent rows 74 would not have to be inputted here. The former distance already contains information about the distance between the rows 74, from which the distance between dams 82 depends.

Since the vehicle 10 is driven along the head ditch 82, the dams 82 are oriented perpendicular to the head ditch 82, but not necessarily perpendicular to the rows 74 and furrows 76, 78. Due to trigonometric effects, this has an impact on the distance between the adjacent dams 82, as can be seen in FIG. 2, where the dams 82 at the left end are spaced further apart than those at the right end of the drawings. The required distance between the dams 82 is proportional to $1/\cos \alpha$, $\alpha$ being the angle between the heading of the vehicle 10 and the longitudinal direction of the rows 74. Thus, this angle $\alpha$ is calculated in step 112 from the information (a) of step 102 and a direction signal related to the heading of vehicle 10, which is taken from one or both of the location signal generation arrangements 32 and 70. In another embodiment, the direction signal can be taken from a compass or an inertial navigation system or derived from a map according to the position of the vehicle measured by at least one of the location signal generation arrangements 32 and 70. Hence, in step 112 the distance between adjacent dams when driving the vehicle 10 perpendicular to the rows (from step 102, (b) and (c)) is divided by $\cos \alpha$, $\alpha$ calculated based upon the row orientation (step 102 (a)) and the measured heading of vehicle 10 to obtain the required distance from the last dam 82 to the next dam 82.

In step 114 it is determined whether vehicle 10 has already passed the required position. For this step, the distance is taken from one or both of the location signal generation arrangements 32 and 70. In another embodiment, a radar sensor for measuring ground speed or a tachometer associated with the vehicle 10 can be used, the speed signals of which are integrated to determine if the desired position has been passed. If in step 114 the required distance has not been covered, step 110 is repeated again.

It should be noted that steps 112 and 114 are executed a number of times before the next dam 82 is reached. For simplification, it would be sufficient to perform step 112 only once, approximately when the vehicle 10 is approximately in the middle between two dams 82 (this location can be derived from the distance between two dams 82 determined before the last dam 82 was built), in order to compensate for continuously changing steering directions when driving curves and for reducing the computational efforts. However, these steps can be executed as many times as required by the system to achieve the desired results.

If in step 114 the required distance has been covered, in some embodiments of the invention, step 116 is executed, showing a message on a display of the operator interface 30 in which the operator is asked whether he or she would like to make a manual adjustment. The operator can then input whether a manual adjustment is intended; if not, step 108 follows. Otherwise the operator can input required corrections into the operator interface 30, which are then automatically used by controller 26 to position vehicle 10 accordingly, and/or vehicle 10 can be driven forward by the operator until a confirmation input into the operator interface 30 is made, confirming that the latch 66 can now be raised since the tool 54 is in the correct location to leave a new dam 82. Then, also step 108 follows.

In a preferred embodiment, the vehicle 10 is automatically steered along the head ditch 80, based upon a map stored in memory 28 and signals from one or both of the location signal generation arrangements 32 and 70. Before the actuator 68 is lifted, the vehicle 10 can be slowed down or stopped to allow the operator to visually check whether the tool 54 is in an appropriate position before actuator 68 is lifted, and to perform manual corrections, when necessary, via operator interface 30 or by controlling the vehicle 10 manually. However, this verification is not required.

It would also be possible to input fine adjustment data or correction data into operator interface 30 if the dams 82 would otherwise not be in the appropriate location. This fine adjustment or nudge feature allows the operator to continuously fine tune the system to accommodate historical field errors.

The invention is not only suited to build rotobucks as described, but can be used for any agricultural operation at the end of rows that need to be made in defined positions with respect to the location of the rows. Having described the preferred embodiment, it will become apparent that various modifications can be made without departing from the scope of the invention as defined in the accompanying claims.

The following is claimed:

1. A method of performing agricultural operations on a field with parallel arranged rows having ends, comprising the following steps:
    propelling a vehicle past the ends of the rows;
    generating a position of the implement and deriving a heading of the implement by a location signal generation arrangement;
    performing agricultural operations related to formation of dams for surface water management with an implement connected to the vehicle at desired positions related to the positions of the rows under control of a controller;
    the controller controlling the implement to perform the operations based upon stored information about the orientation of the rows, stored information about a distance between adjacent rows, a distance signal related to a distance traveled by the vehicle and a direction signal related to the heading of the vehicle, and the desired position and angle of each of the dams with respect to a head ditch; and
    instructing, by the controller, an actuator of the implement to build the dam or deposit material for the dam at the desired position compensating for orientation of the rows with respect to the heading of the vehicle such that the required distance between adjacent ones of the dams is proportional to $1/\cosine \alpha$, where $\alpha$ is the angle between the heading of the vehicle and the longitudinal direction of the rows.

2. The method according to claim 1, wherein the controller is controlling the operations based upon a calculated angle between the rows and the heading of the implement, the controller deriving the angle from the stored information about the orientation of the rows and from the direction signal related to the heading of the vehicle.

3. The method according to claim 1, wherein at least one of the distance signal and the direction signal is provided by a location signal generation arrangement generating location data of the position of at least one of the vehicle and the implement.

4. The method according to claim 3, wherein the location signal generation arrangement is mounted to one of the vehicle and the implement.

5. The method according to claim 1, wherein an operator inputs at least one of information about the orientation of the rows, information about the distance between adjacent rows, information about a desired distance between adjacent operations, information about an offset between the positions of the location signal generation arrangement and the implement, information about a desired location of a first operation, and information about the dimensions of the implement, via an operator interface into a memory connected to the controller, the controller using the information stored in the memory when controlling the implement.

6. The method according to claim 1, wherein on the field an irrigation arrangement with raised rows, lower furrows between the rows, and a transverse head ditch in the vicinity of the ends of the furrows is provided, and
    the implement is depositing ground material at the desired positions in order to provide at least one of dams between the head ditch to prevent water from the head ditch to enter into pre-selected, dry furrows or dams matching up with adjacent raised rows so that water runs down each furrow.

7. The method according to claim 6, wherein the implement is scraping ground material together when the vehicle is moving, and the controller is controlling the implement to release the ground material at the desired position to build a dam.

8. A controller for controlling agricultural operations on a field with parallel arranged rows having ends, wherein:
    the controller is connected to a location signal generation arrangement to receive a position of the implement and derive a heading of the implement;
    the controller is provided on a vehicle to which an implement for performing agricultural operations, related to formation of dams for surface water management, is connected;
    the controller operable to control the agricultural operations of the implement at desired positions related to the locations of the rows, when the vehicle is propelling past the ends of the rows, based upon at least one of stored information about an orientation of the rows, stored information about a distance between adjacent rows, a distance signal related to a distance traveled by the vehicle, a direction signal related to a heading of the vehicle, and the desired position and angle of each of the dams with respect to a head ditch, and
    the controller arranged to instruct an actuator of the implement to build the dam or deposit material for the dam at the desired position; compensating for orientation of the rows with respect to the heading of the vehicle such that the required distance between adjacent ones of the dams is proportional to $1/\cosine \alpha$, where $\alpha$ is the angle between the heading of the vehicle and the longitudinal direction of the rows.

9. The controller according to claim 8, wherein the controller is operable to control operations based upon a calculated angle enclosed between the furrows and a heading of the implement, the controller deriving the angle from the stored information about the orientation of the rows and from the direction signal related to the heading of the vehicle.

10. The controller according to claim 8, wherein at least one of the distance signal and the direction signal is provided by a location signal generation arrangement generating location data of the position of at least one of the vehicle and the tool.

11. The controller according to claim 10, wherein the location signal generation arrangement is mounted to one of the vehicle and the implement.

12. The controller according to claim 8, wherein an operator interface is provided, allowing an operator to input at least one of the information about the orientation of the rows, the information about the distance between adjacent rows, information about a desired distance between adjacent operations, information about an offset between the positions of the location signal generation arrangement and the implement, information about a desired location of a first operation, information about dimensions of the implement, and fine adjustment data for positions at which the operations are performed into a memory connected to the controller, the controller operable to use the information stored in the memory when controlling the implement.

13. A vehicle for performing agricultural operations on a field with parallel arranged rows having ends, wherein:
   an implement for performing agricultural operations, related to formation of dams for surface water management, is connected to the vehicle;
   a location signal generation arrangement for generating a position of the implement and deriving a heading of the implement;
   a controller for controlling the implement to perform the operations is provided on the vehicle;
   the controller is operable to control the operations of the implement at desired positions related to the positions of the rows, when the vehicle is moving past the ends of the rows, based upon stored information about at least one of an orientation of the rows, stored information about a distance between adjacent rows, a distance signal related to a distance traveled by the vehicle, a direction signal related to the heading of the vehicle, and the desired position and angle of each of the dams with respect to a head ditch; and
   an actuator for instruction by the controller to build the dam or deposit material for the dam at the desired position; compensating for orientation of the rows with respect to the heading of the vehicle such that the required distance between adjacent ones of the dams is proportional to l/cosine $\alpha$, where $\alpha$ is the angle between the heading of the vehicle and the longitudinal direction of the rows.

14. The vehicle according to claim 13, wherein the controller is controlling the operations based upon a calculated angle enclosed between the furrows and the heading of the implement, the controller deriving the angle from the stored information about the orientation of the rows and from the direction signal related to the heading of the vehicle.

15. The vehicle according to claim 13, wherein at least one of the distance signal and the direction signal is provided by a location signal generation arrangement generating location data of the position of at least one of the vehicle and the tool.

16. The vehicle according to claim 13, wherein the location signal generation arrangement is mounted to one of the vehicle and the implement.

17. The vehicle according to claim 13, wherein an operator interface is provided, allowing an operator to input at least one of the information about the orientation of the rows, the information about the distance between adjacent rows, information about a desired distance between adjacent operations, information about an offset between the positions of the location signal generation arrangement and the implement, information about a desired location of a first operation, information about dimensions of the implement, and fine adjustment data for positions at which operations are performed into a memory connected to the controller, the controller operable to use the information stored in the memory when controlling the implement.

18. The vehicle according to claim 13, wherein on the field an irrigation arrangement with raised rows, lower furrows between the rows, and a transverse head ditch in the vicinity of the ends of the furrows is provided, and the implement is arranged to deposit ground material at desired locations in order to provide at least one of dams between the head ditch to prevent water from the head ditch to enter into pre-selected, dry furrows and dams matching up with adjacent raised rows so that water runs down each furrow.

19. The vehicle according to claim 18, wherein the implement is suited to scrape ground material together when the vehicle is moving, and the controller is operable to control the implement to release the ground material at the desired location to build a dam.

\* \* \* \* \*